United States Patent
Marten

(10) Patent No.: US 8,269,455 B2
(45) Date of Patent: Sep. 18, 2012

(54) CHARGE BALANCING SYSTEM

(75) Inventor: Victor Marten, Flushing, NY (US)

(73) Assignee: Sendyne Corporation, New York, NY (US)

( * ) Notice: Subject to any disclaimer, the term of this patent is extended or adjusted under 35 U.S.C. 154(b) by 0 days.

(21) Appl. No.: 13/503,640

(22) PCT Filed: Jul. 28, 2011

(86) PCT No.: PCT/IB2011/053357
§ 371 (c)(1),
(2), (4) Date: Apr. 23, 2012

(87) PCT Pub. No.: WO2012/042401
PCT Pub. Date: Apr. 5, 2012

(65) Prior Publication Data
US 2012/0206095 A1    Aug. 16, 2012

Related U.S. Application Data

(60) Provisional application No. 61/387,730, filed on Sep. 29, 2010.

(51) Int. Cl.
*H02J 7/00* (2006.01)
*G01N 27/416* (2006.01)
*G08B 21/00* (2006.01)

(52) U.S. Cl. ........ 320/107; 320/132; 320/116; 320/124; 320/149; 324/426; 340/636.1; 340/636.21

(58) Field of Classification Search ................... 320/107
See application file for complete search history.

(56) References Cited

U.S. PATENT DOCUMENTS

| | | | | |
|---|---|---|---|---|
| 5,818,702 A * | 10/1998 | Faulk | ............................. | 363/16 |
| 5,945,806 A * | 8/1999 | Faulk | ............................. | 320/127 |
| 6,142,130 A * | 11/2000 | Ward | ............................. | 123/606 |
| 6,356,055 B1* | 3/2002 | Lin et al. | ...................... | 320/116 |
| 6,511,764 B1 | 1/2003 | Marten | | |
| 6,518,725 B2* | 2/2003 | Marten | ........................ | 320/116 |
| 7,558,080 B2* | 7/2009 | Chen et al. | ...................... | 363/17 |
| 2002/0190692 A1* | 12/2002 | Marten | ........................ | 320/116 |
| 2008/0211456 A1* | 9/2008 | Bolz et al. | ...................... | 320/116 |
| 2009/0265121 A1* | 10/2009 | Rocci et al. | ...................... | 702/57 |

FOREIGN PATENT DOCUMENTS

WO    2009-010590 A1    1/2009

* cited by examiner

*Primary Examiner* — Yalkew Fantu
(74) *Attorney, Agent, or Firm* — Oppedahl Patent Law Firm LLC

(57) ABSTRACT

A method, circuit, and topology are provided for utilization of this circuit in Li-Ion or any other battery that benefits from balancing between individual cells. The whole system is characterized as having high efficiency (and thus low heat losses) compared to previous art implementations. The actions of the circuit are continuous and bi-directional in respect to each cell.

20 Claims, 3 Drawing Sheets

*a.) Dissipative Balancing*  *b.) Chain Balancing*  *c.) Charge-only Balancing*

CHARGE BALANCING SYSTEM

This application claims the benefit of U.S. application No. 61/387,730 filed Sep. 29, 2010.

BACKGROUND

Application of electrical energy in modern times often involves rechargeable batteries. Every household or place of business typically has several devices that operate from rechargeable batteries.

A promising technology for rechargeable batteries that has been employed in numerous applications is based on electrochemical reactions involving Lithium. The so-called Lithium-Ion (Li-Ion) batteries of many different arrangements and material composition have been designed and used worldwide.

These batteries are typically lighter and store more energy in a given volume than the batteries based on the previous technologies, such as Lead-Acid, Nickel-Cadmium, etc.

The Lithium-chemistry batteries are, however, sensitive to over-charging that may lead to spontaneous and irreversible overheating and even fire/explosion.

At the same time, the Li-Ion cells are sensitive to over-discharge, as irreversible electro-chemical reactions take place and the cells quickly lose their ability to store charge (e.g. the capacity of the cells gets quickly reduced).

In order to store significant amounts of electrical energy, the individual Li-Ion cell are typically organized into batteries that contain series-connected cell. Since all the cells receive the same charging current, if a single cell reaches its maximum charge, the charging current must be stopped in order to prevent overcharging of that single cell. However, the rest of the cells will at that point not yet have received the full charge. After several charge/discharge cycles, it may well be that the whole battery becomes totally unusable, as some cells are totally discharged.

That is why it is typical that the Li-Ion battery includes some kind of equalization circuit that tries to "balance" the whole battery, allowing it to have useful life that is much longer that just several charge/discharge cycles, typically allowing hundreds or even thousands of cycles.

Thus the balancing circuit is an important building block for utilization of the Li-Ion batteries.

There are two types of balancing circuits, referring to the ability of the circuit to remove energy from one cell and deposit the energy in another cell (a so-called active balancing), and operations where the energy is simply dissipated as heat if a cell is close to overcharging (called passive or dissipative balancing).

An active balancing scheme is preferable not only due to the energy savings reasons (so as to reduce the energy costs), but also for the reduction of the heat generated in the battery; the heat having a detrimental effect on the useful life of the battery.

An example of passive balancing is shown in FIG. 1a.

Dissipative Balancing. A number of cells 1, each cell having corresponding Resistor 2 and Switch 3 (that is typically a semiconductor device controlled by the monitoring circuitry), are connected in series. While charging, if a cell's potential gets close to the voltage that indicates full charge, at a time when the rest of the cells are not fully charged, a Switch 3 for that cell is activated (closed), and the current flowing via Resistor 2 discharges the cell. Depending on the magnitude of the discharge current flowing via Resistor 2, it may or may not be necessary to interrupt the "main" charging current through the whole battery.

Obviously, this method results in high heat losses. This method can produce a balanced state of the battery only while the battery is charging, and typically only for a condition of full charge. When the battery is discharged, as soon as one cell reaches the minimum allowed voltage potential, the whole battery is considered discharged and not able to provide any more energy. At the same time, other cells in the battery may well have significant amounts of energy left; however the Dissipative Balancing scheme does not allow recovery of this energy.

Another method is shown in FIG. 1b.

Chain Balancing. The two-cell balancing circuit 4 is able to transfer charge from one cell to the next cell in the series-connected stack of cells. While the method can formally be called "active balancing" due to energy transfer from one cell to the next (rather than dissipating the excess energy as heat), in reality the resulting heat losses during operations of the circuits of this type are high. It will be readily recognized that the energy transfer by this "chain" method is only efficient if the cells that need to be balanced are located close to each other in the series-connected string. On the other hand, if a cell with higher voltage is located relatively far from the cell that is having a lower voltage (e.g. having several cells in the chain between them), then the total efficiency for the power transfer will be the product of efficiency for all the transfers that are needed to move the energy from higher-charged cell to the lower-charged cell. For example, if the two-cell balancing circuit has 80% efficiency, and there are five cells between the cells that need to exchange the energy, then the resulting efficiency will only be about 26% ($0.8*0.8*0.8*0.8*0.8*0.8=0.262$).

In practical terms, there will be very little benefit in energy savings as compared with purely passive/dissipative balancing method, with significantly higher costs due to complexity of the two-cell balancing circuits.

Yet another active balancing scheme is depicted in FIG. 1c.

Charge-only Balancing. A transformer having multiple windings over Core 6 is utilized to charge all the cells at the same time, with a natural result that the voltage of all the cells is the same. This "simultaneous" charging can occur in addition to a larger charging current that is flowing through the series-connected cells in the battery. It will be recognized that the diodes 5 that are needed in this circuit will prevent operations with high efficiency due to non-zero forward voltage drop in the semiconductor diode; in addition, this type of circuits only permits the addition of energy to cells, and can only be deployed if the whole battery is somewhat discharged; it is unsuitable if one of the cells has to be discharged rather than charged.

Many active balancing approaches require measurement of the state of charge of each cell, and control or manipulation of the balancing system to bring about balancing. It would be helpful if an approach could be found that was self-adjusting and self-correcting and did not rely upon measurement of the state of charge of each cell.

It would be helpful if a way could be found to provide balancing between cells that is more efficient than prior-art approaches, and that can offer its benefits during charging times, discharging times, and idle times.

SUMMARY OF THE INVENTION

The current invention discloses a method, circuit, and topology for utilization of this circuit in Li-Ion or any other battery that benefits from balancing between individual cells. The whole system is characterized as having high efficiency (and thus low heat losses) compared to previous implementations. In addition, the balancing of individual cells in the battery can be continuous, if so desired, and occurring throughout charging as well as discharging operations of the battery. All cells are balanced by either adding or removing the energy from each cell, as required in order to attain the balance between all the cells (e.g. the actions of the circuit are bi-directional). The fact of the permitted continuous operations allows each cell to be charged and discharged fully; this supports utilization of the previously unused cells' energy storage capacity resulting from manufacturing tolerances (e.g. varying cells' capacity even in a single manufacturing lot). Operations of the circuit do not require any intelligent controls besides simply turning the circuit on; the balancing processes are self-adjusting and self-correcting.

DESCRIPTION OF THE DRAWING

The current invention is disclosed with the aid of a drawing in several figures, of which.

DETAILED DESCRIPTION

Figure 3:
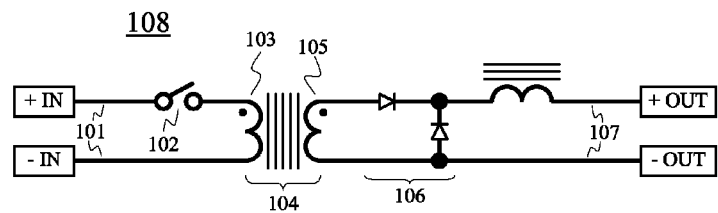
FIG. 3 shows a prior-art forward converter.

It may be helpful to review the well-known basic forward converter 108 as shown in FIG. 3. It is a DC-to-DC converter with galvanic isolation provided by transformer 104. Because there are very few lossy elements (no transistors half-on or half-off, for example, and very little ohmic resistance) the efficiency of the forward converter can be quite good.

Energy is passed from input 101 to output 107 during the times when current is changing in the transformer.

The voltage output at 107 from a forward converter is proportional to the turns ratio (secondary turns count at 105 divided by primary turns count at 103) and to the duty cycle at the primary (defined by the behavior of switch 102) and to the input voltage at 101.

The forward converter 108 of FIG. 3 is, of course, not symmetric. It only passes energy from the input 101 to the output 107 and not the other direction.

Figure 4:
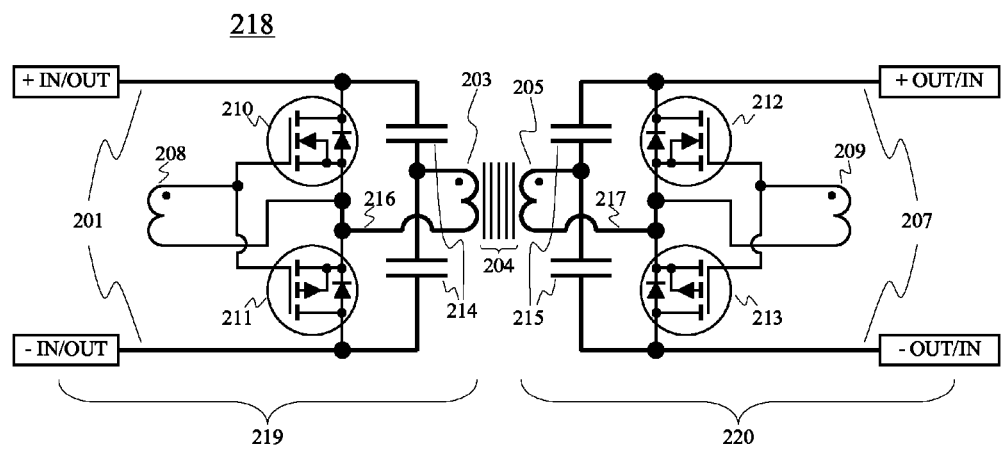
FIG. 4 shows an embodiment of a bidirectional forward converter.

Turning to FIG. 4, we see a forward converter 218 according to the invention. In this figure, the circuit is symmetric, meaning that the circuitry 219 and 220 are mirror images of each other, reflected about the transformer core 204. As will be discussed further below, importantly either of connection points 201 and 207 can be an input or an output for purposes of the forward converter transfer function.

Windings 208 and 209 are control windings, providing an identically phased control signal to each of the circuits 219, 220, typically a square wave. Because the control currents are inductively coupled, they may be thought of as positive-going and negative-going excursions relative to nodes 216, 217, and thus they turn on transistor pairs 210, 211 and 212, 213 in alternation. For example during one excursion the "top" transistors 210, 212 are on, and during the other excursion the "bottom" transistors 211, 213 are on.

The turns counts are identical at the windings 203, 205, thus the turns ratio is unity.

The alert reader will thus begin to appreciate the interesting aspects of the circuits 219, 220. Each circuit behaves slightly differently depending on whether the voltage imposed upon it from outside is higher or lower as compared with the voltage imposed upon the other circuit from outside. Again in this example we have one rechargeable cell at 201 and another rechargeable cell at 207, and the behavior of the circuit is different depending on the relative voltages at the two cells. If the cell at 201 is of slightly lower voltage compared with the cell at 207, then it will tend to be on the receiving end of a forward converter function passing current to 201. If the cell at 207 is of slightly lower voltage compared with the cell at 201, then it will tend to be on the receiving end of a forward converter function passing current to 207. In the case where the cells are at the same voltage, then little or no energy will pass one way or the other through the circuit 218.

As a matter of terminology one might refer to each of circuits 219, 220 as a "half-forward-converter" or "half-converter".

It will be appreciated that rectifying elements 106 in FIG. 3 bring about significant heat losses in circuit 108, due to large forward voltage drop on the diodes. In contrast, the circuit 218 in FIG. 4 utilizes so-called Synchronous Rectifiers. It is not known in advance which of the parts 219/220 will perform the Synchronous Rectifier duty; this depends on the values of the voltages at 201 and 207. As mentioned above, if these two voltages are exactly the same, the circuit 218 will not transfer energy in either direction.

Figure 1:
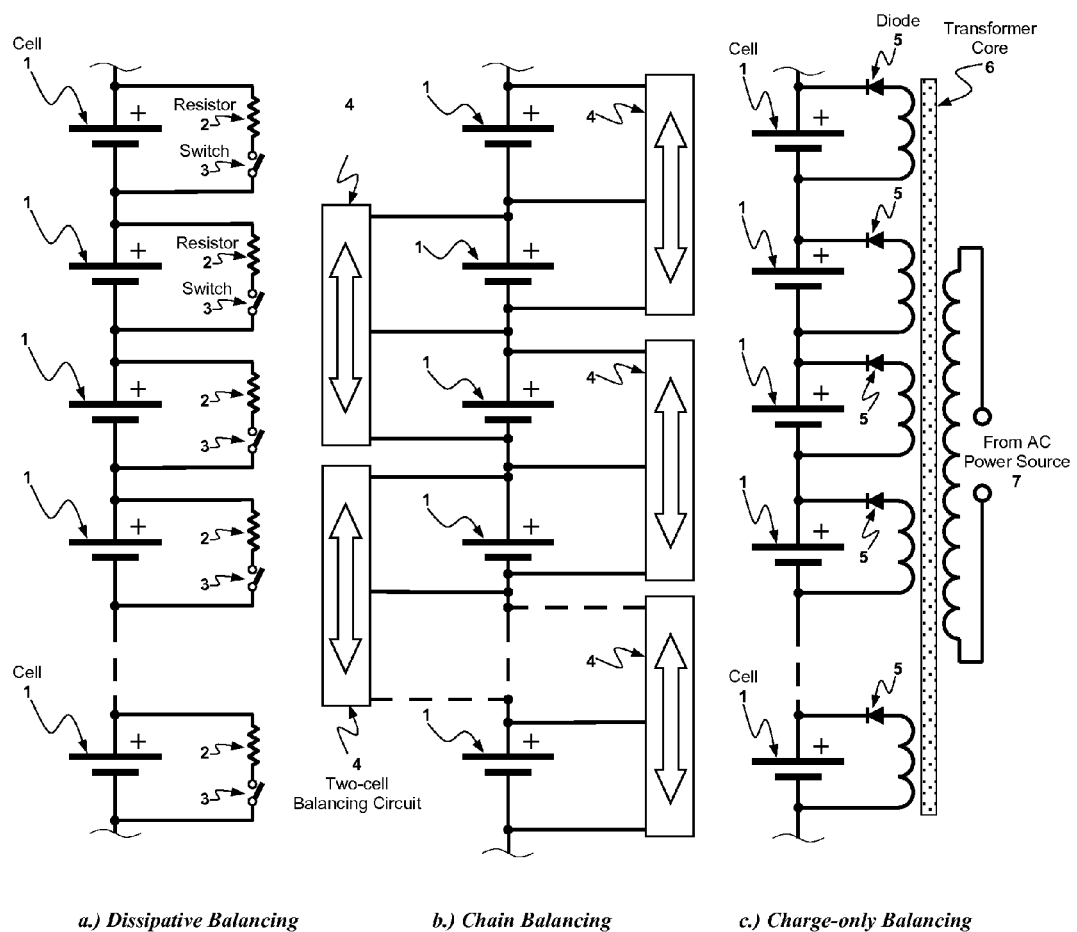
FIG. 1 illustrates some prior-art circuits.
Figure 2:
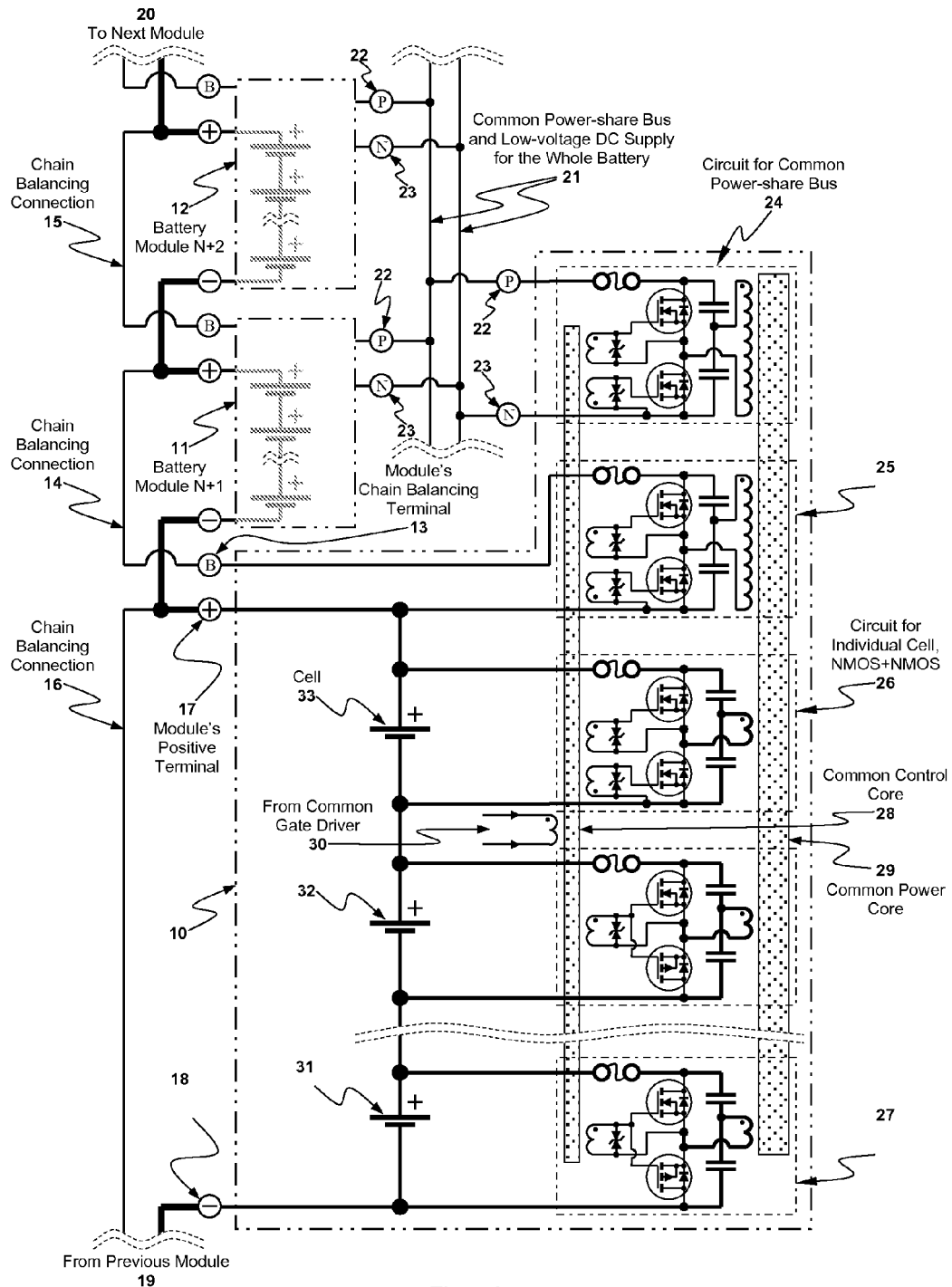
FIG. 2 shows an embodiment of the current invention.

Turning to FIG. 2, the battery is organized as a number of Modules (of which several are shown in the drawing, namely 10, 11, and 12); each Module consists of a number of cells, such as 31, 32, and 33.

Each cell has an associated balancing circuit that is coupled to all other balancing circuits within the Module (via Common Power Core 29), and associated to other Modules either via Chain Balancing Terminals (such as 13), or via Common Power-share Bus 21.

The individual balancing circuits for each cell might be called Isolated Half-Bridge Forward Converters with Synchronous Rectifiers; the very same power transistors that perform a Half-Bridge duty (if the cell is having a higher voltage and thus is being discharged by sourcing the current) may be called to perform Synchronous Rectification duty if the cell is having a lower voltage (and is accepting the charging current). The transition from discharging to charging is automatic and does not require any controlling actions.

Two different possible configurations are shown, namely a circuit for individual cells with NMOS and PMOS transistors 27, and a circuit with two NMOS transistors 26.

All balancing circuits within a single Module share a single Power Core 29 and a single Control Core 28 that is used to provide the activating gate drive potentials to all the transistors. The signal from the Common Gate Driver 30 is simply a 50% duty cycle square wave of appropriate amplitude. Alternatively, the common gate driver circuit 30 may re-circulate the charge stored on the Gates of the transistors, in order to reduce the operating energy (losses) of the balancing circuits.

If the cells' voltage potentials are all the same, no charge or discharge current is flowing to or from any cell.

As a single Module would typically be constructed with 6-12 cells, the balancing action within the Module is very effective, and efficiency of passing the charge from one cell inside the Module to any other cell inside the Module is equal to the efficiency of a single-stage Forward Converter with Synchronous Rectifiers. This efficiency can be as high as 95% or more.

On the other hand, if two Modules are connected via a chain balancing connection such as 14, the energy transfer efficiency will be the somewhat lower, equal to the product of two-stage transfer, or 90% for the above-mentioned example of 95% efficiency for the individual circuits.

The same two-stage efficiency will be achieved if an exchange of energy is required between a cell in one Module and another cell that is located many cells away in the series-connected chain. In this case the energy will be transferred with the same two-stage efficiency as the chain balancing, with power flowing through the common power-share bus 21 via connection 22 and 23 that are coupled with circuit 24.

Only one or both connections from chain balancing and common power-share balancing need be employed; the preference of one or another or both balancing links between the Modules of the whole battery depends on operating conditions and other practical considerations.

Returning to FIG. 4, the alert reader appreciates that there is no reason at all why the number of circuits 219, 220 coupled with core 204 must be limited to two. In a battery module made up of ten cells in series, one could just as well provide ten circuits like 219, one connected metallically to each of the cells, each circuit coupled to the core 204. In this way the ten cells could be constantly balancing each other.

But the generalization does not stop with balancing among cells in a single battery module. Again returning briefly to FIG. 2, an entire battery module 11 can have its own circuit 25 which couples to a core 29. The module can achieve balancing with individual cells such as 33. It will be appreciated that the only circuit modifications that are needed to make this work are (a) selection of turns counts to maintain needed ratios, and (b) satisfaction of needed voltage ratings in selection of components such as the transistors.

A last area of generalization is that the connection point 201 (in FIG. 4) need not be to an individual cell (such as 33 in FIG. 2) and need not be to a battery module (such as module 11 in FIG. 2) but can be to a generalized metallic bus (such as 21 in FIG. 2). The bus could be at any desired DC level, so long as the turns count for its circuit (24 in FIG. 2) is selected appropriately.

In one embodiment all of the balancing is cell to cell, mediated by a transformer core. In another embodiment modules are balanced with modules, again mediated by a transformer core. In another embodiment cells or modules are balanced with each other, mediated by cores connected by appropriate circuitry through a metallic bus. What these embodiments have in common is:

each element being balanced with other elements is galvanically isolated from those other elements; and
balancing takes place in an automatic and smooth way, not requiring explicit feedback or sensing circuitry.

As mentioned earlier the drive signal (at winding 30 in FIG. 2) is thought preferably to be a square wave. The goal is for each transistor of each half-converter to be either "on" or "off" and rarely if ever to be anywhere in between. This minimizes resistive losses within the transistors. What remains is to consider the frequency selected for this drive. As a general matter one would like the frequency to be relatively high, at least a few kilohertz or tens of kilohertz, because this makes the transformer defined by core 29 (FIG. 2) or core 204 (FIG. 4) more efficient. Stated differently this permits the core to be reduced in size (and thus in weight) as compared with what would be needed if the drive were at a lower frequency.

On the other hand if the drive frequency were too high, this could result in "smearing" of the square wave drive signal as it passes through core 28 (FIG. 2) and eventually the desired lockstep in which all of the "top" transistors are on simultaneously, and are never on at the same time as any of the "bottom" transistors, might be lost at times.

It may be instructive to discuss the sizing of core 29 (FIG. 2) or core 204 (FIG. 4) as well as the choice of cross-sectional area for the wire employed in windings 203, 205 (FIG. 4). The sizing decisions are based upon the amount of current that needs to be passed back and forth among cells and among cell modules, as the case may be. The current delivered to the load (at terminals 19, 20 in FIG. 2 for example) can be quite large, for example providing acceleration power for an electric car; such current might be hundreds or even thousands of amperes.

In contrast, the currents required to achieve cell balancing might be relatively modest compared with the load current just mentioned. Thus the core sizing and wire cross-section choices may only need to support currents of a few amperes or perhaps fractions of an ampere. If the only balancing is cell balancing then the core and wire cross sections can be quite modest. If balancing on the module level is to be carried out as well, then the core and windings would need to be somewhat bigger, but still would not need to be so large as to support load currents.

The control core (28 in FIG. 2) can be much smaller than the power core (29 in FIG. 2). It only needs to generate voltages large enough to turn on the gates of the transistors 210, 211, 212, 213. The cells being balanced are described here in the context of electrochemical cells, but the balancing could be carried out with electrostatic cells, that is, capacitors.

The alert reader will have no difficulty devising myriad obvious improvements and variations of the invention, having been inspired by what is disclosed herein. All such improvements and variations are intended to be encompassed by the claims which follow.

The invention claimed is:

1. A high efficiency balancing of individual cells in a battery comprising: a power core; a control core; a gate driver driving the control core with a varying drive signal;
   at least first and second half-converters, each half-converter inductively coupled with the power core and with the control core, each half-converter comprising:
   a first winding disposed for inductive coupling with the power core, the first winding having at least a first tap and a second tap;
   a second winding disposed for inductive coupling with the control core, the second winding having at least a first tap and a second tap;
   a first terminal and a second terminal, the first terminal and the second terminal connected by at least one semiconductor switch with the first winding;
   the at least one semiconductor switch having a control terminal, the control terminal of the semiconductor coupled with the second winding.

2. The apparatus of claim 1 further comprising, for each half-converter, a respective energy storage device having first and second terminals, the first terminal of the half-converter conductively coupled with the first terminal of the respective energy storage device, and the second terminal of the half-converter conductively coupled with the second terminal of the respective energy storage device.

3. The apparatus of claim 2 wherein the respective energy storage devices are connected in series with each other.

4. The apparatus of claim 2 wherein the second terminal of the respective energy storage for the first half-converter is electrically connected with the first terminal of the respective energy storage for the second half-converter.

5. The apparatus of claim 2 wherein the respective energy storage device for each half-converter comprises an electrochemical cell.

6. The apparatus of claim 2 wherein the respective energy storage device for each half-converter comprises a battery comprising electrochemical cells in series.

7. The apparatus of claim 2 wherein the respective energy storage device for each half-converter comprises a capacitor.

8. The apparatus of claim 2 wherein the respective energy storage device for each half-converter comprises a module comprising capacitors in series.

9. The apparatus of claim 1 wherein the first half-converter is further characterized in that there are provided first and second semiconductor switches, each of the first and second semiconductor switches being an NMOS transistor having a gate and first and second power connections, the second tap of the first winding connected to the second power connection of the first switch and to the first power connection of the second switch and to the second tap of the second winding, the first terminal connected with the first power connection of the first switch and connected via a capacitor with the first tap of the first winding, the second terminal connected with the second power connection of the second switch and connected via a capacitor with the first tap of the first winding, the first tap of the second winding connected with the gate of the first switch;

the first half-converter further comprising a third winding disposed for inductive coupling with the control core, the third winding having at least a first tap and a second tap, the first tap of the third winding connected with the gate of the second switch, the second tap of the third winding connected with the second power connection of the second switch.

10. The apparatus of claim 1 wherein the first half-converter is further characterized in that there are provided first and second semiconductor switches, the first semiconductor switch being an NMOS transistor having a gate and first and second power connections, the second semiconductor switch being a PMOS transistor having a gate and first and second power connections, the second tap of the first winding connected to the second power connection of the first switch and to the first power connection of the second switch and to the second tap of the second winding, the first terminal connected with the first power connection of the first switch and connected via a capacitor with the first tap of the first winding, the second terminal connected with the second power connection of the second switch and connected via a capacitor with the first tap of the first winding, the first tap of the second winding connected with the gate of the first switch and with the gate of the second switch.

11. The apparatus of claim 1 wherein the number of half-converters is at least six, each half-converter connected at its first and second terminals to a respective energy storage device, the respective energy storage devices electrically connected in series with each other.

12. The apparatus of claim 1 wherein the drive signal is at least thirty kHz.

13. The apparatus of claim 12 wherein the drive signal is at least one hundred kHz.

14. The apparatus of claim 13 wherein the drive signal is at least two hundred kHz.

15. The apparatus of claim 14 wherein the drive signal is at least one MHz.

16. A method for use with a high efficiency balancing of individual cells in a battery comprising: a power core; a control core; a gate driver disposed for driving the control core with a varying drive signal;

at least first and second half-converters, each half-converter inductively coupled with the power core and with the control core, each half-converter comprising:

a first winding disposed for inductive coupling with the power core, the first winding having at least a first tap and a second tap;

a second winding disposed for inductive coupling with the control core, the second winding having at least a first tap and a second tap;

a first terminal and a second terminal, the first terminal and the second terminal connected by at least one semiconductor switch with the first winding;

the at least one semiconductor switch having a control terminal, the control terminal of the semiconductor coupled with the second winding; the method comprising the steps of: driving the control core with a varying drive signal.

17. The method of claim 16 wherein the drive signal is at least thirty kHz.

18. The method of claim 17 wherein the drive signal is at least one hundred kHz.

19. The method of claim 18 wherein the drive signal is at least two hundred kHz.

20. The method of claim 19 wherein the drive signal is at least one MHz.

* * * * *